A. L. & R. ANDERSON.
CLAMP FOR BRACING WIRES OR CABLES OF AIRCRAFT AND OTHER STRUCTURES.
APPLICATION FILED MAR. 7, 1918.

1,301,634. Patented Apr. 22, 1919.

Witnesses:

Inventors
Allan Lindsay Anderson
Robert Anderson
by
Attorney

UNITED STATES PATENT OFFICE.

ALLAN LINDSAY ANDERSON, OF GORTON, AND ROBERT ANDERSON, OF MANCHESTER, ENGLAND.

CLAMP FOR BRACING WIRES OR CABLES OF AIRCRAFT AND OTHER STRUCTURES.

1,301,634.          Specification of Letters Patent.      Patented Apr. 22, 1919.

Application filed March 7, 1918. Serial No. 220,955.

*To all whom it may concern:*

Be it known that we, ALLAN LINDSAY ANDERSON and ROBERT ANDERSON, British subjects, residing at Gorton, county of Lancaster, England, and at Higher Openshaw, Manchester, county of Lancaster, England, respectively, have invented certain new and useful Improvements in Clamps for Bracing Wires or Cables of Aircraft and other Structures, of which the following is a specification.

This invention relates to an appliance or device for clamping the bracing wires or cables of cross-braced structures more particularly the external cross-bracing on aeroplanes or other aircraft.

It is well known that external bracing on aircraft is subject to extremely rapid vibration when the machine is in flight and in the case of cross bracing this is most deleterious as it causes chafing of the bracing wires or cables at the points of crossing. Moreover, in the case of bracing wires of relatively flat or streamline section the effect of this vibration is to cause such wires to turn about their longitudinal axes so as to present their broader faces to the direction of flight and thus the aerodynamical advantages of using such sections are lost.

To eliminate these defects and reduce the amplitude of the vibrations it is common to tie the bracing wires or cables at their points of crossing by lapping them with wire.

The invention consists essentially in constructing a clamping device of streamline or approximately streamline conformation so that its employment does not materially increase the head resistance of the machine and comprises two clamping members of which one or both are transversely slotted to a depth to accommodate the cross bracing ties and means for drawing the clamping members together to grip the ties firmly, said clamping members being so conformed that when secured together on the bracing they present a streamline contour to the direction of flight; and also in means for insulating the cross ties comprising a central bore in the device and washers or packing blocks to be inserted therein.

The device is applicable either to single or to multiple cross bracing where two wires or where more than two wires or ties cross within the device.

The invention will be fully described with reference to the accompanying drawings.

Figure 1:
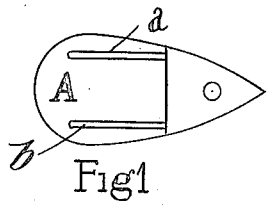

Figure 1. is a side elevation of the streamline clamping device.

Figure 2:
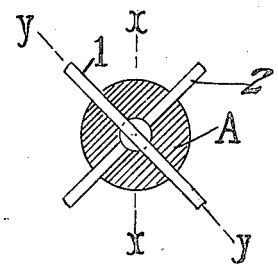

Fig. 2. is a transverse section of same.

Figure 3:
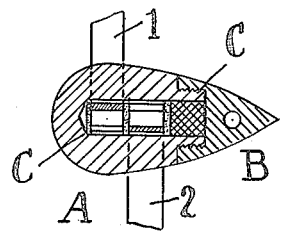

Fig. 3. is a longitudinal section on line $x$—$x$.

Figure 4:
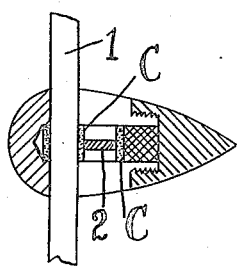

Fig. 4. is a longitudinal section on line $y$—$y$.

Figure 5:
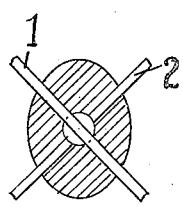

Fig. 5. is a transverse section showing a modified shape.

Figure 6:
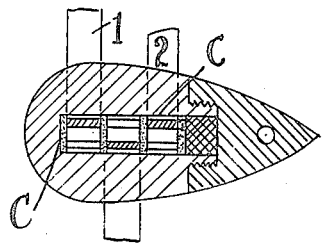

Fig. 6. is a longitudinal section showing three bracing ties.

Figure 7:
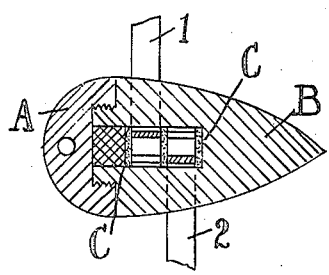
Figure 8:
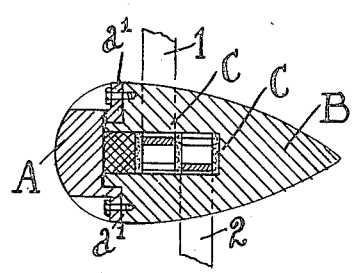

Figs. 7 and 8. are longitudinal sections showing other modifications.

The clamping device is constructed of two members a nose piece A and a tail piece B of such external conformation or contour that, when secured together, they present a substantially streamline contour to the line of flight. To accommodate the wires narrow crossing slots $a$ and $b$ are cut in the nose piece A. Thus the wire 1 is accommodated wholly within the slot $a$ while the wire 2 lies within slot $b$. The device is preferably bored centrally to receive washers or packing blocks C to be placed at either side of the wires 1 and 2 and between them to prevent the crossing wires or cables chafing each other. The washers or packing blocks C will preferably be made of some elastic or shock absorbing material such as soft aluminium, lead, compressed fiber, wood, cork or rubber.

The end of the nose piece A is screw threaded externally and the end of the tail piece screwed internally to secure the two members together as in Figs. 1 to 6.

In practice a washer C is first inserted into the bore and another between the wires the nose piece A slipped over the wires, another washer inserted in the bore and the tail piece screwed on to the screwed end of the nose piece of the device.

The device shown in Fig. 5. is similar in construction and method of application to that illustrated in the preceding figures but in order that the effective area presented in the direction of flight may be reduced in the case of large bracings an elliptical cross section is employed. Thus the nose piece A and the tail piece B are both elliptical in cross section but the device when assembled presents a substantially streamline form both in side elevation and in plan. In all other respects the description of Figs. 2 to 5 applies to Fig. 6.

In a modified form the tail piece B may be slotted and the nose piece A attached thereto by screwing on to the tail piece as in Fig. 7. or by setscrews $a'$ as in Fig. 8.

From the foregoing it will be seen that our invention is applicable to cross bracing either with cable or with swaged wires and moreover that considerable advantage accrues from the use of interposed washers in that they functionate both as packing and also for the purposes of shock absorption and the prevention of chafing.

What we claim as our invention and desire to protect by Letters Patent is:—

1. A clamping device for the cross bracing wires of aircraft and other structures constructed of streamline conformation and comprising two clamping members rounded or inclinued to the front and tapering to the rear provided with transversely disposed slots to receive the bracing wires substantially as described.

2. A clamping device for the cross bracing wires of aircraft and other sturctures constructed of streamline conformation comprising two clamping members rounded or tapering to the front and rear provided with transversely disposed slots to receive the bracing wires and means for securing the two members together and clamping them upon the wires substantially as described.

3. A clamping device for the cross bracing wires of aircraft and other structures constructed of two parts of streamline conformation, provided with transversely disposed slots to receive the bracing wires, shock absorbent packing to separate the wires when in the slots, and screws to secure the two members together and clamp them upon the wires.

4. A clamping device for the cross bracing wires of aircraft and other structures, constructed of two parts of streamline conformation provided with transversely disposed slots to receive the bracing wires, a central bore to receive packing shock absorbing washers and a screw device to secure the two members together and clamp them upon the wires substantially as described.

5. In a clamping device for the cross bracing wires of aircraft and other structures constructed of two clamping members rounded and tapering to the front and rear, the combination of a nose piece and a tail piece provided with transversely disposed slots to receive the wires, and screws to secure the two members together and clamp them upon the wires.

6. In a clamping device for the cross bracing wires of aircraft and other structures constructed of streamline conformation, the combination of a nose piece and a tail piece provided with transversely disposed slots to receive the wires and a central bore to receive packing washers, shock absorbent washers inserted therein, and a screw to secure the two members together and clamp them upon the wires, substantially as described.

In testimony whereof we have hereunto set our hands in presence of two subscribing witnesses.

ALLAN LINDSAY ANDERSON.
ROBERT ANDERSON.

Witnesses:
  I. OWDEN O'BRIEN,
  GEO. H. O'BRIEN.